UNITED STATES PATENT OFFICE 2,640,079

ALKYLBENZYLTHIURONIUM SALTS

Peter L. de Benneville, Philadelphia, Pa., Norman H. Leake, Bristol, Tenn., and Louis H. Bock, Shelton, Wash., assignors to Rohm & Haas Company, Philadelphia, Pa., a corporation of Delaware No Drawing. Application March 8, 1950, Serial No. 148,514

8 Claims. (Cl. 260—564)

This invention relates to alkylbenzylthiuronium salts of the formula

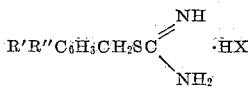

wherein R' is an alkyl group of 7 to 12 carbon atoms, R'' is hydrogen or the methyl group, and X is a salt-forming anion particularly a halogen. These compounds are effective bactericidal and fungicidal agents.

There have previously been proposed hydroxy benzylthiuronium salts. Such compounds found their utility in their lack of stability and their reactivity with fibrous materials, imparting through their reaction therewith hydrophobic properties. The previously known hydroxybenzylthiuronium salts, however, have only a small fraction of the bactericidal and/or fungicidal activity of the compounds of this invention.

Compounds of the above formula are prepared by reacting by heating together an alkylbenzyl halide and thiourea. Temperatures from 50° to 100° C. are generally suitable. The reaction is preferably carried out in the presence of an inert, volatile organic solvent, such as methanol, ethanol, isopropanol, acetone, methyl ethyl ketone, isopropyl ether, etc.

The product can usually be obtained by crystallization from the solvent or it may be recovered as a residue after evaporation of solvent.

Typical alkylbenzyl halides which can be used include heptylbenzyl, octylbenzyl, nonylbenzyl, decylbenzyl and dodecylbenzyl halides and heptylmethylbenzyl, octylmethylbenzyl, decylmethylbenzyl, and dodecylmethylbenzyl halides in their various isomeric forms. Thus the alkyl groups may be primary, secondary, or tertiary, straight or branched.

Benzene or toluene may be alkylated and then halomethylated. Reactions for carrying out these various steps are in general known, but for efficient halomethylation of an alkylbenzene or alkyltoluene when the alkyl groups contain as many as seven carbon atoms, special procedures are needed. The problem here is to ensure primarily introduction of one halomethyl group per phenyl group and yet to halomethylate the alkylbenzene or alkyltoluene practically completely. This avoids the contamination of halomethylated product and even the final product with considerable hydrocarbon and also avoids a need for separating reaction products and starting materials.

Some typical starting hydrocarbons are (1-methylhexyl) benzene, (1,3-dimethyl-1-propylbutyl) benzene, (1-methylheptyl) benzene, (3,5,5-trimethylhexyl) benzene, o-, m-, or p-octyltoluene, (1,3,3-trimethylbutyl) benzene, p-dodecyltoluene, etc.

A satisfactory method for haloalkylating alkylbenzenes and alkyltoluenes when the alkyl group is of relatively large size is described in application Serial No. 28,274, filed by De Benneville and Bock on May 20, 1948, now abandoned. Halomethylation is accomplished by reacting the alkylbenzene or alkyltoluene with anhydrous formaldehyde and hydrogen chloride or bromide in the presence of a catalyst mixture formed by mixing one molecular proportion of zinc chloride with 1.5 to 8 molecular proportions of an aliphatic monocarboxylic acid of one to three carbon atoms, such as formic, acetic, chloroacetic, or propionic. Acid anhydride may be used in place of or in admixture with such acid. Formaldehyde may be used as a gas or as a revertible polymer. The equivalent of formaldehyde and hydrogen chloride or bromide is provided by a halomethyl ether.

The difficulty of halomethylation increases with the size of the alkyl substituent. Thus for heptylbenzene somewhat less exacting conditions are operative than for decylbenzene. When the alkyl substituent is relatively large, the preferred ratio of catalyst to alkylbenzene or alkyltoluene is in the range of 0.75 to 2.5 moles of zinc chloride per mole of hydrocarbon. Lower amounts of catalyst, while providing rapid reaction, do not usually give complete reaction unless the alkyl substituent is relatively small, for example, a group of seven or eight carbon atoms. For one mole of alkylbenzene from one to 2.5 and preferably 1.5 to 2.5 moles of formaldehyde are used. Reaction temperatures of 50° to 100° C. are useful. Good yields of alkylbenzyl halides are obtained with introduction mostly of a single halomethyl group and without formation of troublesome resinous products.

Typical preparations of alkylbenzyl and alkylmethylbenzyl halides are shown in the following examples.

Example 1

Commercial 3-heptanol was dehydrated on an alumina catalyst at 400° C. to yield a mixture of 2-heptene and 3-heptene which was condensed and distilled.

There were mixed 125 parts of this product, 198 parts of benzene, and 196 parts of concentrated sulfuric acid while the mixture was stirred and held at 5° C. The mixture was stirred for three hours with the temperature of the mixture being allowed to advance above room temperature. Layers were permitted to form and the upper layer was taken. It was twice washed with sulfuric acid and distilled to yield 167 parts of heptylbenzene, probably a mixture of 2-heptylbenzene and 3-heptylbenzene. The product had a carbon content of 87.3% and a hydrogen content of 11.7%, compared with theoretical values of 88.6% and 11.7% respectively.

There were mixed 160 parts of this product, 90 parts of anhydrous zinc chloride, and 138 parts of glacial acetic acid. Thereto was added at 60° C. 106 parts of dichloromethyl ether. The mixture was stirred for four hours and then allowed to stand and separate into layers. The upper layer was washed with water, with sodium bicarbonate solution, and with water and then distilled. At 127°–132° C./2 mm. there was obtained a fraction of 128 parts which corresponded in composition to heptylbenzyl chloride.

*Example 2*

To a mixture of 70 parts of 2-ethylhexylbenzene (prepared according to the method of Sulzbacher and Bergmann, J. Org. Chem. 13, 303 (1948)), 50.3 parts of anhydrous zinc chloride, and 60 parts of glacial acetic acid there was added with stirring 42.5 parts of dichloromethyl ether over the course of an hour, while the reaction mixture was maintained at 60° C. Stirring was continued for another two hours with the temperature held at 60° C. Layers were then allowed to form and separated. The product layer was washed with sodium bicarbonate solution and distilled at 110°–125° C./0.07 mm. The distillate corresponded in composition to 2-ethylhexylbenzyl chloride.

*Example 3*

To a mixture of 138 parts by weight of toluene and 90 parts of anhydrous hydrogen fluoride, contained in a copper flask and held at 0°–10° C., there was added 336 parts of mixed octenes, boiling at 123°–134° C., at such a rate that the temperature did not rise above 10° C. The reaction mixture was stirred for an hour and then poured upon ice. The organic layer was separated, washed with water, with 5% sodium bicarbonate solution, and again with water, dried over calcium chloride, and finally distilled. Unreacted toluene and octene were removed and the organic liquid stripped by heating to 115° C./35 mm. There was then obtained a fraction between 135° C./35 mm. and 155° C./0.5 mm. which consisted essentially of octyltoluenes.

A mixture was made in the reaction vessel equipped with a stirrer of 32 parts of octyltoluene, 25 parts of anhydrous zinc chloride, and 60 parts of glacial acetic acid. With the temperature kept at 50° to 60° C. there was added thereto 20 parts of dichloromethyl ether. The temperature of the mixture was then raised to 90° C. for three hours. The reaction mixture was then separated into layers. The product layer was washed with water, with a 5% sodium bicarbonate solution, and again with water. Upon distillation a fraction was obtained at 133°–148° C./0.3 mm. which corresponded in composition to 2-methyl-5-octylbenzyl chloride.

*Example 4*

To a mixture of 184 parts of toluene and 103 parts of sulfuric acid there was added 112 parts of octene while the mixture was stirred and held at 5°–13° C. The octene had been prepared by dehydration of capryl alcohol on an alumina catalyst (cf. Komarewsky, Ulick, and Murray, J. Am. Chem. Soc. 67, 557 (1945)). The reaction mixture was stirred for three hours at room temperature, and the product layer was separated. It was washed twice with concentrated sulfuric acid and distilled. The fraction taken at 93°–95° C./0.3 mm. corresponded in composition to sec.-octylmethylbenzene.

To a mixture of 81 parts of this product, 47.5 parts of anhydrous zinc chloride, and 65 parts of glacial acetic acid there was added 46 parts of dichloromethyl ether while the mixture was stirred and held at 50°–60° C. for an hour. It was stirred at 70°–75° C. for four hours and allowed to form layers. The upper layer was separated, washed with water and sodium bicarbonate solution, and distilled. The fraction taken at 130°–150° C./0.3 mm. amounted to 43.8 parts and corresponded in composition to methyloctylbenzyl chloride.

*Example 5*

A mixture of 95 parts by weight of octylbenzene (chiefly 2-octylbenzene with some 3-octylbenzene), 30 parts of paraformaldehyde, 54 parts of anhydrous zinc chloride, and 120 parts of glacial acetic acid was stirred at 50° C. while hydrogen chloride was passed in for two hours at a fairly rapid rate. The reaction mixture was allowed to stratify and the upper layer was taken, washed with hot water, with a 10% sodium bicarbonate solution, and with hot water, dried over sodium sulfate and distilled. The forerun of 30 parts consisted of octylbenzene. There was then obtained at 119°–121° C./1 mm. 71 parts of octylbenzyl chloride.

*Example 6*

To a mixture of 46.5 parts of octylbenzene (chiefly 2-octylbenzene), 17 parts of anhydrous zinc chloride, and 40 parts of glacial acetic acid there was added dropwise 50 parts of bis-bromomethyl ether. The mixture was stirred and heated at 70° C. for four hours in all. Layers were allowed to form and were separated. The upper layer was washed with hot water, with 10% sodium bicarbonate solution, and with water. It was dried over sodium sulfate and distilled. At 155°–174° C./2 mm. there was obtained a fraction corresponding in composition to octylbenzyl bromide. It contained by analysis 28.8% of bromine. Theory for this product is 28.3%.

*Example 7*

Commercial diisobutyl carbinol was dripped slowly over a bed of alumina at 400° C. The vapors were taken off and condensed. Therefrom nonene was separated and distilled at 72°–75° C./100 mm. The product, containing by analysis 85.7% of carbon and 14.3% of hydrogen, was 2,6-dimethyl-3-heptene, for which the theoretical content of carbon is 85.8% and of hydrogen is 14.3%.

There was added 135 parts by weight of this product to a stirred mixture of 159 parts of benzene and 147 parts of sulfuric acid. The temperature was held between 0° and 10° C. After the mixture had been stirred for three hours, it was allowed to form layers. The upper layer was distilled and the distillate redistilled at 102°–106° C./3 mm. This distillate had a molecular weight of 203 (theory 204) and corresponded in composition to nonylbenzene. The yield was 95 parts.

To a mixture of 80 parts of nonylbenzene, 40 parts of zinc chloride, and 59 parts of glacial acetic acid there was added at room temperature 45 parts of dichloromethyl ether. The mixture was stirred and heated at 70° C. for three hours. It was then allowed to stand and form layers. The upper layer was separated, washed with hot water, and with sodium bicarbonate solution, dried over sodium sulfate, and distilled. The fraction distilling at 141°–142° C./2 mm. was nonylbenzyl chloride.

*Example 8*

To a mixture of 312 parts of benzene and 180 parts of sulfuric acid was added dropwise at 10°–20° C. 281 parts of decene, which was freshly prepared by dehydration of n-decenol on alumina. The mixture was stirred for five hours at room temperature. It was then allowed to form layers. The upper layer was separated, washed with concentrated sulfuric acid twice, and distilled. The fraction distilling at 115°–127° C./1.3 mm. was identified as sec.-decylbenzene.

A mixture of 54.5 parts of this sec.-decylbenzene, 27.3 parts of zinc chloride, and 60 parts of glacial acetic acid was stirred and heated to 70°–75° C. while 28.8 parts of dichloromethyl ether was slowly added. Stirring was continued at 70°–80° C. for five hours. Layers were allowed to form. The upper layer was separated, washed with water and sodium bicarbonate solution, dried, and distilled. At 155°–175° C./1.8 mm. there was obtained a fraction of 30 parts which corresponded in composition to sec.-decylbenzyl chloride.

*Example 9*

Dodecyltoluene was prepared by mixing 344 parts of toluene and 294 parts of concentrated sulfuric acid and, while the mixture was stirred and the temperature maintained below 10° C., dodecylene was slowly added. The dodecylene used was a propylene tetramer. After 506 parts of dodecylene were added, the mixture was allowed to come to room temperature and stirring was continued for 24 hours. After separation from the acid layer the product was washed with concentrated sulfuric acid and distilled in vacuo. Five hundred fifty-five parts of a colorless liquid boiling at 110°–160° C. at 1.2–2.2 mm. of mercury was obtained.

A mixture of 450 parts of dodecyltoluene with 105 parts of formaldehyde, 175 parts of anhydrous zinc chloride, and 250 parts of glacial acetic acid was stirred at 60°–70° C. while hydrogen chloride was passed in rapidly for two hours. Absorption was rapid and the reaction was accompanied by a rise of temperature. The lower catalyst layer was drained off and the product washed with water, 10% sodium carbonate solution, and again with water, then dried in vacuo on a steam-bath. Four hundred ninety parts of a yellow liquid having a chlorine content of 11.2% was obtained. The theoretical chlorine content of dodecylmethylbenzyl chloride is 11.5%. This material distills almost completely at 145°–185° C. at 0.5–1 mm. of mercury. It may, however, be used without further purification.

In the following examples the reaction between alkylbenzyl halide and thiourea is shown with details of procedure and evaluation with respect to bactericidal action.

*Example 10*

A mixture of 122 parts by weight of heptylbenzyl chloride and 41 parts of thiourea was taken up in 200 parts by weight of ethanol. The resulting solution was heated under reflux for four hours. It was cooled and filtered to give 100 parts of crystalline product. The product as obtained had a chlorine content of 11.7%. It corresponded in composition to

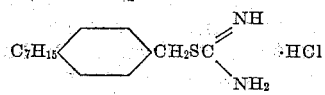

Evaluated against *Salmonella typhosa*, it had a phenol coefficient of 440.

*Example 11*

A mixture of 47.7 parts of (1-methylheptyl)-benzyl chloride, 15.2 parts of thiourea, and 50 parts of ethanol was heated under reflux for four hours. The reaction mixture was cooled with precipitation of solid material, which was separated by filtration. This material was found to have a chlorine content of 11% and corresponded in composition to

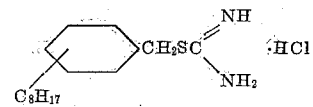

Against *Salmonella typhosa* this product had a phenol coefficient of 1000.

*Example 12*

A mixture of 56.6 parts of octylbenzyl bromide (chiefly the (2-octyl)benzyl bromide), 15 parts of thiourea, and 50 parts of isopropanol was heated under reflux for an hour. The reaction mixture was left standing overnight at room temperature. A solid material formed which was separated by filtration. It corresponded in composition to

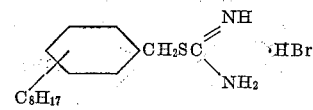

Against *Salmonella typhosa* this product had a phenol coefficient of 850.

*Example 13*

A mixture of 51 parts of octylmethylbenzyl chloride, 15 parts of thiourea, and 40 parts of ethanol was heated under reflux for five hours. The product was obtained as in previous examples. It corresponded in composition to

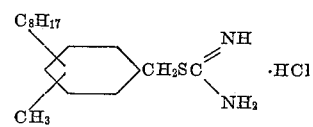

and had a phenol coefficient of 900 against *Salmonella typhosa*.

*Example 14*

A solution of 51.4 parts of a nonylbenzyl chloride (the nonyl group being 1,2,4,4-tetramethylpentyl), 15.2 parts of thiourea, and 40 parts of ethanol was heated under reflux for 2.5 hours and left standing overnight at room temperature. The solid which had formed was filtered off, washed with anhydrous ethanol, and dried to yield 41.4 parts of a colorless, crystalline product. It contained according to the analyses 10.83% of chlorine and corresponded in compositions to

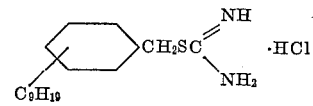

It was found to have a phenol coefficient against *Salmonella typhosa* of 885.

Example 15

A mixture of 63.4 parts of dodecylmethylbenzyl chloride and 15.2 parts of thiourea was heated under reflux in 43 parts of ethanol and 25 parts of acetone. After heating had been carried on for 4.5 hours, the solvent was distilled off to leave a clear yellow glass, which after heating in vacuo amounted to 77 parts. This product had the formula $C_{12}H_{25}(CH_3)C_6H_3CH_2SC(NH)NH_2 \cdot HCl$. It had a phenol coefficient against *Salmonella typhosa* of 330.

The compounds of this invention are effective fungicidal and fungistatic agents. In slide germination tests against spores of *Sclerotinia fructicola* and *Macrosporium sarcinaeforme* it was demonstrated that the compounds inhibit germination at dilutions of one to 10,000 to 20,000.

We claim:

1. Compounds of the formula

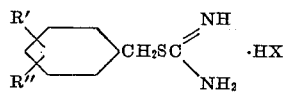

wherein R′ is an alkyl group of 7 to 12 carbon atoms, R″ is a member of the class consisting of hydrogen and the methyl group, and X is a halogen.

2. Compounds of the formula

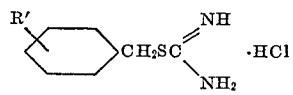

wherein R′ is an alkyl group of 7 to 12 carbon atoms.

3. Compounds of the formula

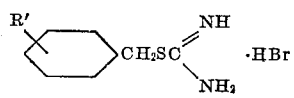

wherein R′ is an alkyl group of 7 to 12 carbon atoms.

4. A compound of the formula

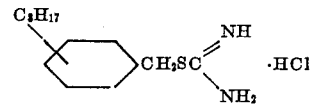

5. A compound of the formula

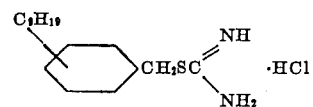

6. A compound of the formula

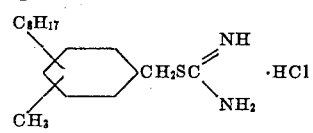

7. A compound of the formula

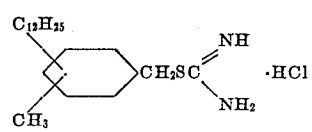

8. S-(octylbenzyl)isothiuronium halide.

PETER L. DE BENNEVILLE.
NORMAN H. LEAKE.
LOUIS H. BOCK.

References Cited in the file of this patent
UNITED STATES PATENTS

| Number | Name | Date |
|---|---|---|
| 2,270,893 | Orthner et al. | Jan. 27, 1942 |
| 2,302,885 | Orthner et al. | Nov. 24, 1942 |